US009916453B2

(12) United States Patent
McLean et al.

(10) Patent No.: US 9,916,453 B2
(45) Date of Patent: Mar. 13, 2018

(54) DERIVED KEYS FOR EXECUTION ENVIRONMENTS IN A BOOT CHAIN

(71) Applicant: QUALCOMM Incorporated, San Diego, CA (US)

(72) Inventors: Ivan McLean, Solana Beach, CA (US); Ashish Grover, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 14/979,135

(22) Filed: Dec. 22, 2015

(65) Prior Publication Data

US 2017/0177872 A1  Jun. 22, 2017

(51) Int. Cl.
| | | |
|---|---|---|
| G06F 9/00 | (2006.01) | |
| G06F 15/177 | (2006.01) | |
| G06F 21/57 | (2013.01) | |
| H04L 9/08 | (2006.01) | |

(52) U.S. Cl.
CPC .......... *G06F 21/575* (2013.01); *H04L 9/0861* (2013.01); *G06F 2221/034* (2013.01)

(58) Field of Classification Search
CPC .................................................. G06F 21/575
See application file for complete search history.

(56) References Cited

U.S. PATENT DOCUMENTS

| 7,757,295 B1 * | 7/2010 | Hadaaegh | G06F 21/552 |
| | | | 713/189 |
| 8,171,309 B1 | 5/2012 | Poo et al. | |
| 8,423,789 B1 | 4/2013 | Poo et al. | |
| 8,825,921 B2 * | 9/2014 | Westwick | H05B 37/0254 |
| | | | 710/15 |
| 8,856,941 B2 | 10/2014 | Cha et al. | |
| 8,943,598 B1 * | 1/2015 | Kurian | G06F 21/56 |
| | | | 726/22 |
| 9,037,875 B1 | 5/2015 | Poo et al. | |
| 2009/0034741 A1 * | 2/2009 | Sabev | H04L 9/0822 |
| | | | 380/279 |
| 2012/0079279 A1 * | 3/2012 | Leclercq | H04L 9/0825 |
| | | | 713/187 |
| 2015/0082048 A1 | 3/2015 | Ferguson et al. | |
| 2015/0086019 A1 | 3/2015 | Tamminen et al. | |
| 2015/0124961 A1 | 5/2015 | Lambert et al. | |

FOREIGN PATENT DOCUMENTS

| CN | 102752754 A | 10/2012 |
| EP | 2437461 A1 | 4/2012 |
| WO | 2015038690 A1 | 3/2015 |

OTHER PUBLICATIONS

International Search Report and Written Opinion—PCT/US2016/060217—ISA/EPO—dated Jan. 23, 2017—12 pgs.

* cited by examiner

*Primary Examiner* — Mohammad Rehman
(74) *Attorney, Agent, or Firm* — Hunter Clark PLLC (57) ABSTRACT

Methods, apparatus, and computer program products for generating a derivative key for an execution environment (EE) are described. An example of a method includes obtaining a device key by a key derivation circuit, obtaining a context string by the key derivation circuit from a one-time writable bit register (OWBR), generating the derivative key for a current EE by the key derivation circuit based on the device key and on the context string from the OWBR.

31 Claims, 6 Drawing Sheets

DERIVED KEYS FOR EXECUTION ENVIRONMENTS IN A BOOT CHAIN

BACKGROUND

An aspect of this invention generally relates to data processing devices and more particularly to securely generating derivative keys for execution environments in a boot chain.

Most secure electronic systems follow a well-established boot chain sequence for ensuring secure boot with a sequence of execution environments (EEs). The EEs may include a primary boot loader (PBL), a secondary boot loader (SBL), a high level operating system (HLOS) kernel and/or other trusted kernel code, a HLOS, and applications. Initially, the small and highly secure PBL, typically residing in read-only memory (ROM), is used for primordial boot after a power-on-reset. The PBL typically loads and verifies the SBL that resides in an external memory, for example, a flash memory. The SBL may load the HLOS kernel, or other highly trusted code on the device (e.g., ARM® TrustZone® kernel code). Subsequently, the HLOS may be loaded and verified. Finally, the applications may be loaded and executed. Each one of these EEs may require a secure key to encrypt and/or decrypt files, memory and/or other sensitive data assets. Furthermore, for security reasons, the key used by one execution environment (EE) should not be available to another EE. Moreover, for security purposes, the key used by more secure EEs (i.e., those that boot first or earlier in the boot chain sequence) should not be available to any less secure EE (i.e., those that boot later or last in the boot chain sequence).

SUMMARY

An example of a method of generating a derivative key for an execution environment (EE) according to the disclosure includes obtaining a device key by a key derivation circuit, obtaining a context string by the key derivation circuit from a one-time writable bit register (OWBR), and generating the derivative key for a current EE by the key derivation circuit based on the device key and on the context string from the OWBR.

Implementations of such a method may include one or more of the following features. Obtaining the device key may include obtaining a single device key from a non-volatile memory device. Generating the derivative key may include generating an EE-specific derivative key. Generating the EE-specific derivative key may include generating the EE-specific derivative key independently from derivative keys for EEs prior to and subsequent to the current EE in a boot chain sequence. Obtaining the context string may include obtaining a single context string corresponding to the current EE. Obtaining the context string may include obtaining a pair of context strings corresponding to the current EE and the method may further include generating the derivative key for the current EE based on the device key and on an initial context string of the pair of context strings and generating a perturbed output based at least in part on a final context string of the pair of context strings, the perturbed output being unequal to the derivative key. The method may further include determining, by a processor coupled to the key derivation circuit, an existing value in the OWBR, determining, by the processor, that a value of the context string is less than the existing value in the OWBR, and generating, by the processor, an indication of a violation of a context string allocation protocol.

An example of an apparatus according to the disclosure includes a processor, a memory coupled to the processor, the memory including a non-volatile memory device, an output register, and a one-time writable bit register (OWBR), and a key derivation circuit coupled to the non-volatile memory device, the output register, and the OWBR and configured to receive a device key from the non-volatile memory device and a context string from the OWBR and further configured to provide an output to the output register.

Implementations of such an apparatus may include one or more of the following features. The device key may be a single device key. The context string may correspond to a current execution environment (EE) and the output may be an EE-specific derivative key for the current EE. The key derivation circuit may be configured to receive a pair of context strings from the OWBR and the output may include a first output and a second output, the first output being a derivative key based on an initial context string of the pair of context strings and the second output being a perturbed output unequal to the derivative key based on a final context string of the pair of context strings. The apparatus may include one or more OWBRs, a number of OWBRs corresponding to a number of parallel boot flows supported by an electronic system that includes the apparatus. The processor may be configured to determine an existing value in the OWBR, determine that a value of the context string is less than the existing value in the OWBR, and generate an indication of a violation of a context string allocation protocol.

An example of an apparatus according to the disclosure includes means for obtaining a device key by a key derivation circuit, means for obtaining a context string by the key derivation circuit from a one-time writable bit register (OWBR), and means for generating a derivative key for a current execution environment (EE) by the key derivation circuit based on the device key and on the context string from the OWBR.

Implementations of such an apparatus may include one or more of the following features. The means for obtaining the device key may include means for obtaining a single device key from a non-volatile memory device. The means for generating the derivative key may include means for generating an EE-specific derivative key. The means for generating the EE-specific derivative key may include means for generating the EE-specific derivative key independently from derivative keys for EEs prior to and subsequent to the current EE in a boot chain sequence. The means for obtaining the context string may include means for obtaining a single context string corresponding to the current EE. The means for obtaining the context string may include means for obtaining a pair of context strings corresponding to the current EE and the apparatus may further include means for generating the derivative key for the current EE based on the device key and on an initial context string of the pair of context strings and means for generating a perturbed output based at least in part on a final context string of the pair of context strings, the perturbed output being unequal to the derivative key. The apparatus may further include means for determining an existing value in the OWBR; means for determining that a value of the context string is less than the existing value in the OWBR, and means for generating an indication of a violation of a context string allocation protocol.

An example of a non-transitory processor-readable storage medium according to the disclosure may include processor-readable instructions including instructions for obtaining a device key by a key derivation circuit, instructions for obtaining a context string by the key derivation circuit from a one-time writable bit register (OWBR), and instructions for generating a derivative key for a current execution environment (EE) by the key derivation circuit based on the device key and on the context string from the OWBR.

Implementations of such a storage medium may include one or more of the following features. The instructions for obtaining the device key may include instructions for obtaining a single device key from a non-volatile memory device. The instructions for generating the derivative key may include instructions for generating an EE-specific derivative key. The instructions for generating the EE-specific derivative key may include instructions for generating the EE-specific derivative key independently from derivative keys for EEs prior to and subsequent to the current EE in a boot chain sequence. The instructions for obtaining the context string may include instructions for obtaining a single context string corresponding to the current EE. The instructions for obtaining the context string may include instructions for obtaining a pair of context strings corresponding to the current EE and the processor readable instructions may further include instructions for generating the derivative key for the current EE based on the device key and on an initial context string of the pair of context strings and instructions for generating a perturbed output based at least in part on a final context string of the pair of context strings, the perturbed output being unequal to the derivative key. The processor readable instructions may further include instructions for determining an existing value in the OWBR, instructions for determining that a value of the context string is less than the existing value in the OWBR, and instructions for generating an indication of a violation of a context string allocation protocol.

Items and/or techniques described herein may provide one or more of the following capabilities and/or possibly one or more other capabilities not mentioned. Independent cryptographic keys can be derived for execution environments (EEs) in a boot chain sequence. The independent cryptographic keys may eliminate a need to modify the key derivation procedure of a particular EE in response to changes in the boot chain sequence. A single device key used for the primary boot loader may be extended for secure usage in multiple EEs. The single device key may reduce device design complexity and minimize provisioning overhead (e.g., provisioning a single device key may eliminate a need to store a device key per EE). In addition to the single device key, a one-time writable bit register (OWBR) can provide key input material to a hardware key derivation function (HKDF). The key input material may be based on context strings for the EEs allocated according to a context string allocation protocol. The HKDF may generate a new and EE-specific key for each EE based on the single device key. The EE-specific key for a current EE may be inaccessible to subsequent EEs in the boot chain sequence. As a result of using the single device key, the trust in the executing code established by the device key at the PBL stage may not degrade over the course of the boot chain sequence. The properties of the OWBR may prevent keys for previous EEs from being re-created by subsequent EEs. Further, the properties of the OWBR may reduce or eliminate changes to the primary boot loader key generation procedures at each power-on-reset. It may be possible for an effect noted above to be achieved by means other than those noted and a noted item/technique may not necessarily yield the noted effect.

DETAILED DESCRIPTION

Techniques disclosed herein are configured to improve security associated with generated keys for execution environments of data processing devices.

A key input for a hardware embedded key derivation function (HKDF) is provided from a one-time writable bit register (OWBR). The key input is a context string associated with a current execution environment (EE). The current EE may be in a boot chain sequence for one or more integrated circuits, a system-on-chip (SoC), and/or an electronic system including the one or more integrated circuits and/or the SoC. A derivative key for the current EE is generated by the HKDF using the context string from the OWBR and a single device key. The derivative key is output to an output register. The derivative key for the current EE is independent from keys derived for other EEs. The current EE may use the derivative key to encrypt and/or decrypt assets. Subsequent to generating the derivative key by the HKDF and/or obtaining the derivative key by the EE, a processor may change a value of at least one bit in the OWBR. This change perturbs the value in the output register. The perturbed value in the output register clears the derivative key from the output register. The current EE may hand over control of the SoC to a subsequent EE in a boot chain sequence.

Figure 1:
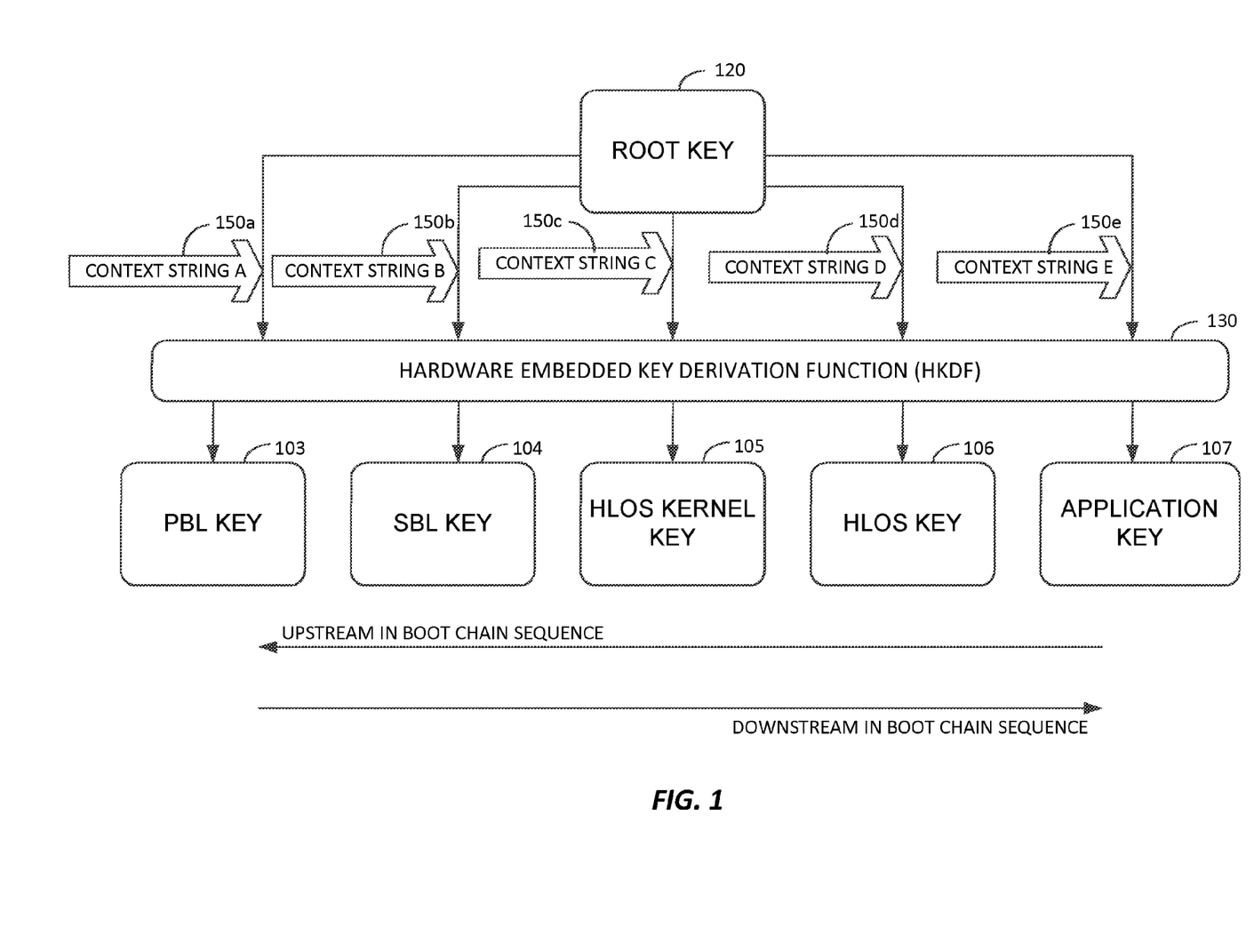
FIG. 1 is a block diagram of an example of a two-level key generation tree structure.

Referring to FIG. 1, a block diagram of an example of a two-level key generation tree structure is shown. The single root key 120 (e.g., a device key, a device symmetric key) may be stored in an OTP memory and provide a root-of-trust. As shown schematically in FIG. 1, the same device key may be used to generate the EE-specific derivative key for each EE in the boot chain sequence. The single root key 120 may provide at least the advantage of eliminating a need to store an EE-specific root key for each EE. For example, the single root key 120 may eliminate a need to store multiple root keys in respective non-volatile memory locations that are physically accessible to only one EE. As a result, dedicated allocation of expensive memory devices (e.g., fuse devices of a one-time programmable (OTP) memory) for all of the EEs associated with the SoC system 200 may not be required. The key structure in FIG. 1 relies at least in part on the one-time writable property of the OWBR. This property provides a capability to irreversibly change keys and key input materials over the course of the boot chain sequence and to reset the key input materials to a consistent initial value at power-on reset.

As shown in FIG. 1, the key material (i.e., the input to the HKDF) for each EE is a respective context string from the OWBR and the root key 120. The HKDF 130 may generate the EE-specific keys based on the root key 120 and an EE-specific context string from the OWBR (e.g., CON- TEXT STRING A 150*a*, CONTEXT STRING B 150*b*, CONTEXT STRING C 150*c*, CONTEXT STRING D 150*d*, CONTEXT STRING E 150*e*). The context strings may be public. The subsequently derived EE-specific keys (e.g., PBL key 103, SBL key 104, HLOS kernel key 105, HLOS key 106, and application key 107) are independent leaf nodes in the two-level tree structure. At least because the key generation is occurring in hardware (e.g., the HKDF, the OWBR, the output register, the device key memory location), the EEs are not generating the key in software which may provide additional security from compromise by observation of EE execution. Neither the derived key for one EE nor a hash or other mathematically or logically manipulated version of the derived key for the one EE forms or provides key input material for any other EE. Thus, the EE-specific keys according to FIG. 1 are independent of one another because the key for one EE is not derived from the key for any other EE. The EE-specific key for the current EE in the boot chain sequence is different from the EE-specific keys for both prior and subsequent EEs in the boot-chain sequence.

The context strings may be public. Additionally, the upstream EE may handle its key in plain text operations. In typical EE operations, the downstream EE has the capability to observe the execution and plain text operations of the upstream EE. Through these observed operations, the downstream EE may discover the prior key. For example, the downstream EE may sniff unencrypted external memory. However, a fundamental hardware property of the OWBR is that the bits in the OWBR cannot be rewritten during a power-cycle of the SoC. Therefore, if the subsequent EE in the boot chain sequence determines and/or obtains the key input context string for a prior EE, this subsequent EE cannot change previously written bit values of the OWBR in order to set the bit values of the OWBR back to previous key input context string. Thus the subsequent EE cannot re-generate a prior key input in the OWBR and therefore cannot re-generate a prior derivative key output from the HKDF. Merely erasing the derivative key output from the output register may not prevent the key output from being re-generated by the subsequent EE. Obtaining the key input context string from a memory device that does not have the properties of the OWBR may not prevent the key output from being re-generated by the subsequent EE. Merely erasing the derivative key output from the output register may not prevent key input material from being re-generated in a memory device that is not the OWBR.

As a benefit of the independent keys, if a hack attempt is successful in re-generating an independent EE-specific, this security compromise may affect only one EE and may not be perpetuated along the boot chain sequence. Additionally, the independent EE-specific keys may also simplify the addition or deletion of one or more EEs in the boot chain sequence. The lack of co-dependence of the keys may reduce or eliminate changes to prior or subsequent EE routines to handle the key derivation changes necessitated by the addition or deletion.

In contrast, dependent EE keys arise when the key for one EE is derived from the key for another EE. Typically, for dependent EE keys, a key for an upstream EE in the boot chain sequence may be used (i.e., may contribute to key material) to derive a key for a downstream EE. For the dependent keys, once one EE in the boot chain sequence has access to the key for a preceding EE, it may then take actions to compromise the dependent keys for the remainder of the EEs in the boot chain sequence.

The key structure in FIG. 1 may provide additional benefits with regard to service infrastructure that may not be realized by dependent keys. EEs in the boot chain sequence are generally serviced by multiple different infrastructures. For example, a SoC manufacturer may service the PBL and SBL, an electronic device manufacturer may service the HLOS kernel (e.g., a trusted execution environment (TEE)), a particular operating system provider may service the HLOS, and particular retail and/or banking institutions may service the applications. As an advantage of the independently derived keys, in the event that key security is compromised for one EE, the security risk may be limited to the one service infrastructure for the compromised EE key. In contrast, a compromised key that is derived from a key for another EE (i.e., the dependent key), may present a security risk to multiple service infrastructures. For instance, a compromise of a key for a Google® HLOS may compromise a key used by Bank of America® for a banking application downstream in the boot chain from the Google® HLOS. For the dependent keys, some or all of the service infrastructures downstream in the boot chain sequence from the current EE may be compromised. As a further advantage of independently derived keys, the key database deployment of one service infrastructure may be generated and deployed independently of any other service infrastructure. Each instance of service infrastructure may maintain its own key database of a global population of the derived keys for a population of devices in the database. The dependent (e.g., chained or interdependent) key generation procedure may require that the key database be passed from one service infrastructure to another along the boot chain sequence. Thus, the database deployment of one service infrastructure may be dependent upon the database deployment of another service infrastructure. As an example, Google®, as service provider for the HLOS, may receive the database from the upstream electronic device manufacturer and generate keys therefrom. In turn, Google® may provide the database to Bank of America® as service provider of a downstream application.

Figure 2:
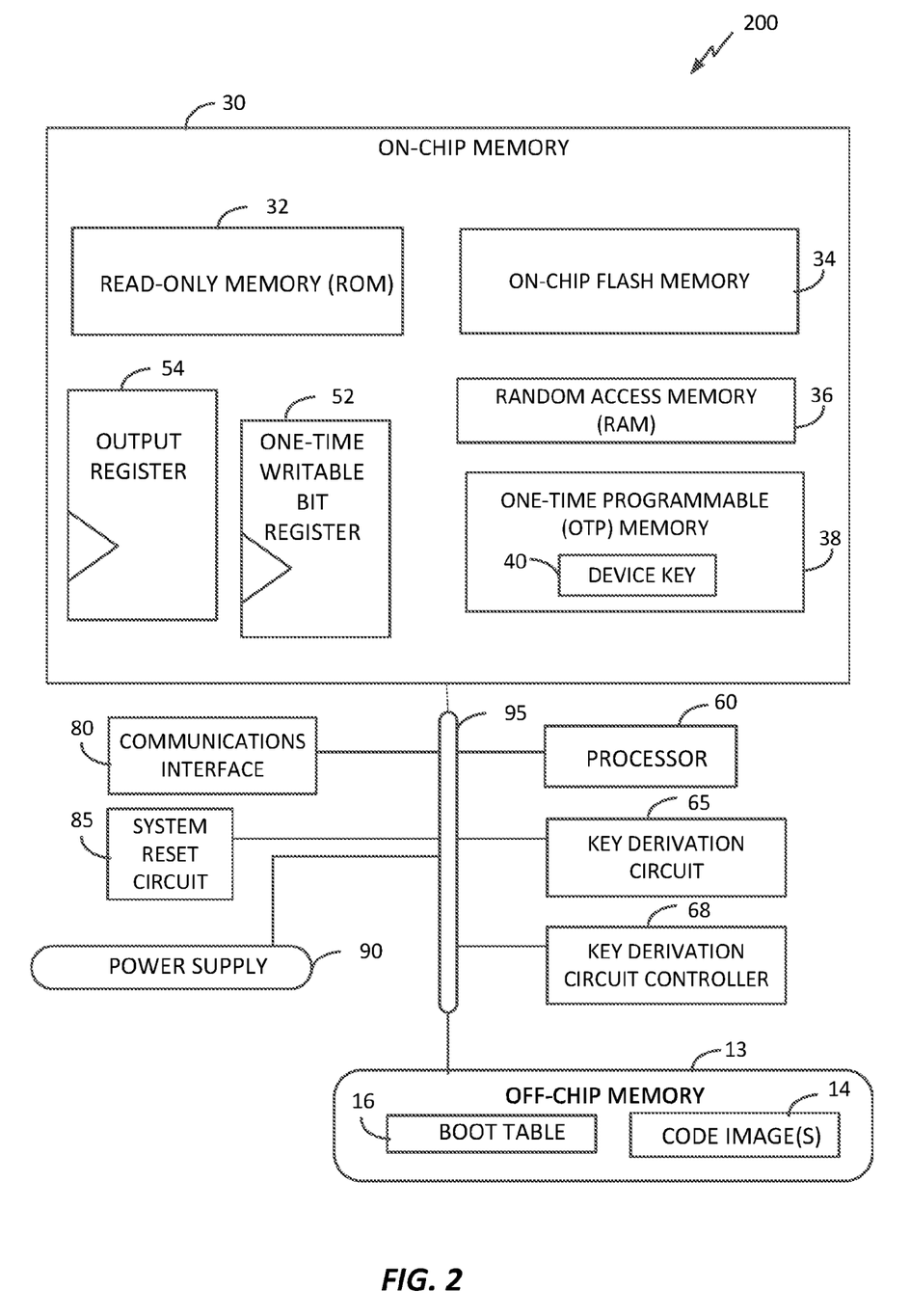
FIG. 2 is a block diagram of hardware components of an example of an integrated circuit system.

Referring to FIG. 2, a block diagram of hardware components of an example of an integrated circuit system is shown. A quantity of each component in FIG. 2 is an example only and other quantities of each, or any, component could be used. The integrated circuit system may include one or more integrated circuits (ICs) and/or discrete electronic devices and may be, for example, a SoC system 200. The integrated circuit system can be part of an electronic system, or end device (not shown), for example, but not limited to mainframes, mini-computers, servers, workstations, set-top boxes, personal computers, laptop computers, mobile devices, hand-held devices, wireless devices, tablets, modems, electronic readers, personal digital assistants, electronic games, automobiles and automobile components, aircraft, machinery, entertainment devices, medical devices, Internet of Things (IoT)/Internet of Everything (IoE) enabled devices, manufacturing devices, and embedded systems. The integrated circuit system can operate in a variety of wired/wireless communication systems and networks. Any or all of the hardware components may be implemented as a number of separate integrated circuits and/or separate devices interconnected with each other. Components of the SoC system 200 are communicatively coupled through a system bus 95.

The off-chip memory 13 is a non-volatile read-write memory. The off-chip memory 13 may include a boot table 16. The boot table 16 may include descriptors (e.g., firmware descriptors, software descriptors) configured to indicate a boot chain sequence according to which the processor 60 may access, read, authenticate, store, and/or execute firmware and/or software in the boot chain sequence. The code images 14 may include the one or more EEs of the boot chain sequence (e.g., a secondary boot loader (SBL), a high level operating system (HLOS) kernel, a HLOS, one or more applications, etc.). In an implementation, on-chip flash memory 34 may include the code images 14.

The communications interface 80 is configured to enable the system 200 to send and receive wireless signals, for example via a wireless antenna (not shown) over one or more communications networks. The communications interface 80 can include wired/wireless interfaces enabling both wired and wireless communications (including such things as a receiver, transmitter, and/or transceiver. These enable communications across and within a variety of communication networks. Examples of such communications networks include but are not limited to a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., 4G, 5G, and so on), such as, for example, Long Term Evolution (LTE), Advanced LTE, WiMax, Ultra Mobile Broadband (UMB), and/or the like. The communications interface 80 may be further configured to communicate and exchange information, including but not limited to location information, either directly or indirectly with other communications network entities, including but not limited to, access points, base stations, navigation servers, location servers, other electronic devices, etc. The communications interface 80 may also be to receive signals from satellite vehicles (SVs) belonging to one or more Satellite Positioning Systems (SPSs), such as the GPS system, the GLONASS system, the Galileo system, and/or other SPSs.

The system reset circuit 85 is an electronic circuit configured to generate a reset signal. The system reset circuit 85 may also be referred to as a power-on-reset circuit. In response to the system reset signal, the SoC system 200 may power down and re-start. At power-on reset (i.e., in response to the system reset signal), various components of the SoC system 200 may initialize to known states. These known states may correspond to a first application of voltage from the power supply 90. For example, values of the registers 52 and 54 may initialize to default unprogrammed values. Execution of PBL software and/or other bootloader software may commence at power-on reset. The power-on reset may also be referred to as a cold boot reset.

The processor 60 (e.g., means for determining an existing value in the OWBR, means for determining that the value of the context string is less than the existing value in the OWBR, means for generating an indication of a violation of a context string allocation protocol) is a physical processor (i.e., an integrated circuit configured to execute operations on the SoC system 200 as specified by software and/or firmware) (e.g., means for generating a key input, means for writing the generated key input, means for obtaining the derivative key, means for writing to at least one bit of an OWBR). The processor 60 may be an intelligent hardware device, e.g., a central processing unit (CPU), one or more microprocessors, a controller or microcontroller, an application specific integrated circuit (ASIC), a general-purpose processor, a digital signal processor (DSP), a field programmable gate array (FPGA) or other programmable logic device, a state machine, discrete gate or transistor logic, discrete hardware components, or combinations thereof designed to perform the functions described herein and operable to carry out instructions on the SoC system 200. The processor 60 may also be implemented as a combination of computing devices, e.g., a combination of DSP and a microprocessor, a plurality of microprocessors, a plurality of control processing units (CPUs), one or more microprocessors in conjunction with a DSP core, or other such configurations. The processor 60 may include co-processors including a crypto-accelerator co-processor designed to perform computationally intensive encoding decoding of information.

The memory 30 (i.e., on-chip memory) can be a non-transitory, processor-readable storage medium that stores processor-readable, processor-executable software and/or firmware instructions that are configured to, when executed, cause the processor 60 to perform various functions described herein (although the description may refer only to the processor 60 performing the functions). Alternatively, the software and/or firmware may not be directly executable by the processor 60 but configured to cause the processor 60, e.g., when compiled and executed, to perform the functions. Code stored in the memory 30 includes instructions that may be part of a program, such as a particular application program and/or an operating system. The code typically includes an executing (e.g., running) program or portion of a program, current program values and state information, and the resources used by the operating system to manage the execution of the code. The memory 30 includes, but is not limited to output register 54, one-time writable bit registers 52, on-chip flash memory 34 (i.e., a non-volatile read-write memory), non-volatile read-only memory (ROM) 32, random access memory (RAM) 36, and one-time programmable (OTP) memory 38. As used herein with regard to memory, the terms "storing," "store," and "stored" are equivalent, respectively, to the terms "writing," "write," and "written."

The OTP memory 38 may be, for example, a programmable read-only memory (PROM) or a field PROM (FPROM). The OTP memory 38 includes fuse devices (e.g., fuses and/or anti-fuses), each of which represents a settable binary value. The OTP memory 38 is manufactured with all of the fuses in an unprogrammed state (e.g., a virgin state or a default state), such as all ones or all zeros. To write data into OTP memory 38, appropriate fuse devices are programmed (e.g., burned) from their default state to a nondefault state. The processor 60 may program (i.e., write values to) the fuse devices of the OTP memory 38. Once programmed, the fuse device is no longer useful to write other data to OTP memory 38 as the fuse device may only be written to (i.e., programmed) one time. The value programmed to a particular fuse device is a permanent value of that fuse device. As such, the value written to the OTP memory 38 does not change in response to a power-on reset of the SoC system 200. The fuse devices may be arranged in arrays with particular fuse devices in the arrays corresponding to particular OTP memory 38 array addresses.

The one-time writable bit register (OWBR) 52 and the output register 54 are readable/writable software registers that include writable non-volatile memory (e.g., EEPROM, flash memory, ferroelectric, RAM, etc.). Each register represents a settable binary value. The processor 60 may read and/or write values to/from the OWBR 52 and the output register 54. Further, the OWBR 52 and the output register 54 are coupled via hardware to the key derivation circuit 65 and the key derivation circuit controller 68. For example, the registers 52 and 54 may be directly hardwired to the key derivation circuit 65 and/or the key derivation circuit controller 68. A binary value can be written to each bit of these registers to transition the bit from an unprogrammed value to a written value (i.e., a programmed value). For example, if the unprogrammed value of the bits in register 52 and/or 54 is "0," a "1" may be written to the bits in the registers 52 and/or 54. Similarly, if the unprogrammed value of the bits in register 52 and/or 54 is a "1," a "0" may be written the bits in the registers 52 and/or 54. The OWBR 52 and the output register 54 both support an unlimited number of read operations per bit per power cycle of the SoC system 200. The output register 54 supports an unlimited number of write operations per each bit per power cycle of the SoC system 200. Further, in response to a system reset signal or power-on event, the bits of the OWBR 52 and the output register 54 may re-set to a default unprogrammed value.

In contrast to the output register 54, the OWBR 52 only supports one write operation per bit per power cycle of the SoC system 200. In other words, each individual bit of the OWBR 52 may be written to only one time per power cycle of the SoC system 200. This property of the OWBR 52 is enforced in hardware. Once a particular bit is written to and transitioned from the unprogrammed value to the written value, that particular bit cannot be re-written to return to the unprogrammed value. For example, if the unprogrammed value of the bit is "0" and a "1" is written to the bit, the value of the bit cannot be changed to "0" within the power cycle. A power cycle starts with a system reset signal or power-on event and ends at a subsequent system reset signal or power-off event. A total number of possible write operations per power cycle for the OWBR 52 is equal to a number of bits in the OWBR 52. As examples, an 8 bit OWBR allows and supports a maximum of 8 write operations per power cycle, a 128 bit OWBR allows and supports a maximum of 128 write operations per power cycle, etc. Once the value is written to the bit in the OWBR 52, that bit value is unchangeable unless there is a system reset signal or power-off event (i.e., unchangeable for the duration of the power cycle of the SoC). In response to the system reset signal, the values of the bits of the OWBR 52 return to the default unprogrammed value. The number of OWBRs 52 provisioned on the SoC system 200 may correspond to a number of parallel boot flows supported by the SoC system 200 (e.g., a number of parallel and/or embedded processors or co-processors and/or other devices on the SoC system 200 implementing a boot chain sequence). Each processing system or subsystem operating on the SoC system 200 may follow a boot flow sequence. One OWBR 52 may be dedicated to each supported boot flow. Thus the SoC system 200 may support one or more boot flows and may include one or more respective OWBRs 52. The one or more OWBRs 52 may be coupled to the key derivation circuit 65, each OWBR of the one or more OWBRs corresponding to a respective system or subsystem.

The device key 40 is stored in a non-volatile memory of the SoC system 200. For example, the device key 40 may be stored in OTP memory 38 or the ROM 32. The manufacturer of the SoC system 200 may store the device key 40 in the non-volatile memory prior to shipment of the SoC system 200 to an electronic device or end device manufacturer (e.g., an original equipment manufacturer (OEM)). The device key 40 may be inaccessible to any software executing on the SoC system 200. As such the device key 40 may only be accessible via hardware. Further, the device key 40 may be a single device key for the SoC system 200. The device key 40 may be a 128 bit or a 256 bit symmetric key. The device key 40 is coupled to the key derivation circuit 65. For example, the memory devices in which the device key 40 is stored may be directly wired to the key derivation circuit 65. The ROM 32 may also include the PBL firmware for primordial booting of the SoC system 200.

The device key 40 and the contents of the OWBR 52 are hardware-accessible only information. As such, these inputs are protected from direct access and direct usage by the EEs executing in the SoC system 200. The EEs cannot read the device key 40 or directly read values from the register 52 as the SoC system 200 does not provide software/firmware paths to the register interfaces or to the device key 40. The EEs may only access this information by proxy. The particular EEs that may access by proxy the contents of the OWBR 52 may be unrestricted.

The key derivation circuit 65 (e.g., means for obtaining a device key, means for obtaining a context string, means for generating a derivative key, means for obtaining a pair of context strings, means for generating a perturbed output) is a hardware embedded key derivation function (HKDF) The key derivation circuit 65 includes digital logic devices configured to implement the key derivation function. The key derivation circuit controller 68 is configured to provide input to and output from the key derivation circuit 65. For example, the key derivation circuit controller 68 may include logic devices and/or electrical circuits configured to connect, in hardware, the OWBR 52, the memory location of the device key 40, the key derivation circuit 65, and the output register 54. Further, the key derivation circuit controller 68 may cause the processor 60 to write to and/or read from the OWBR 52 and/or to read from the output register 54. For example, the key derivation circuit controller 68 may generate electrical signals that cause the processor 60 to perform write and/or read operations to and/or from the registers 52, 54. Alternatively and/or additionally, EE instructions stored in the memory 30 may cause the processor 60 to perform these functions. The generated signals and/or the EE instructions may cause the processor 60 to write particular bit values to the OWBR 52.

Figure 3:
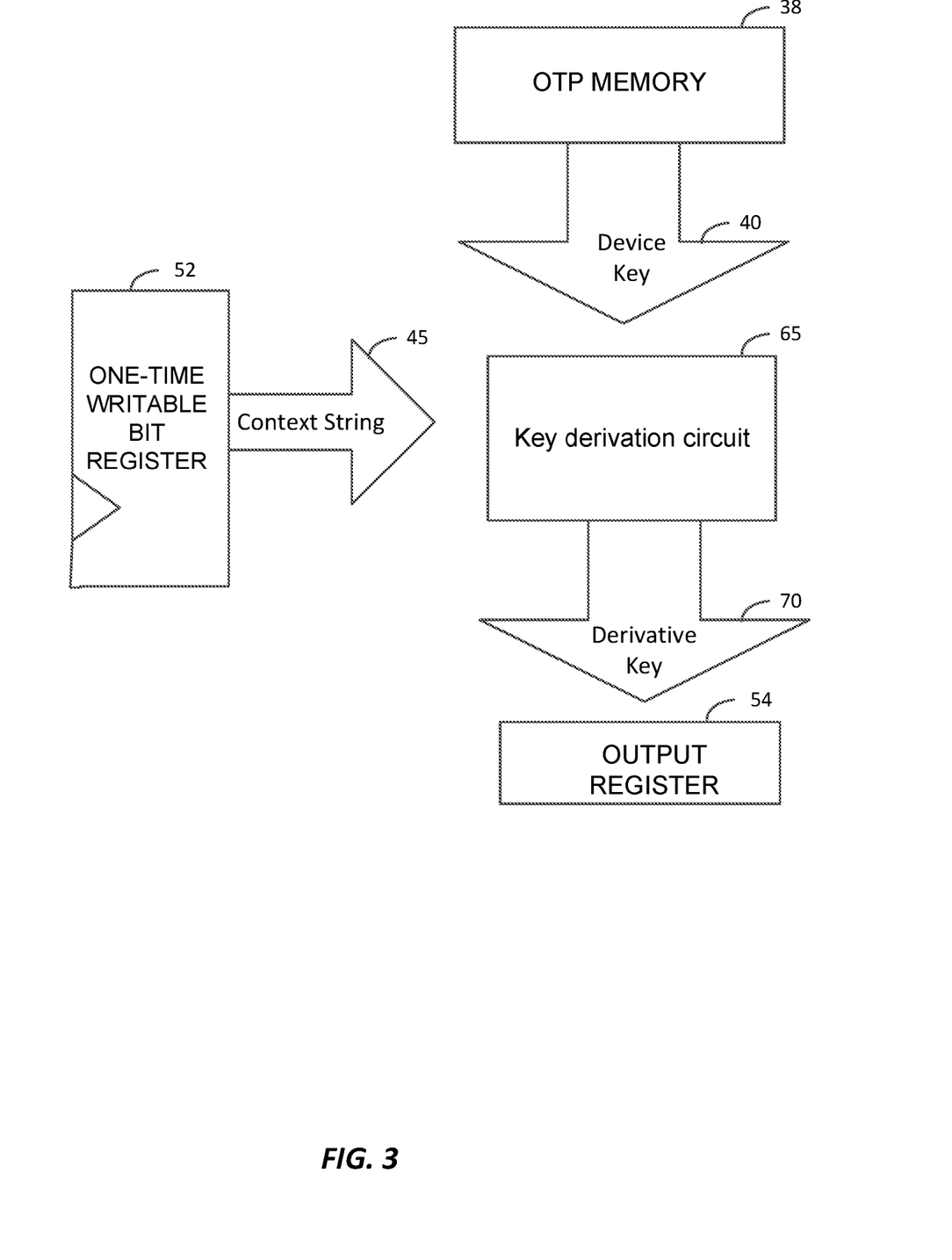
FIG. 3 is a schematic diagram of the functional operations of a key derivation circuit.

Referring to FIG. 3, with further reference to FIG. 2, a schematic diagram of the functional operations of the key derivation circuit is shown. The key derivation circuit 65 is configured to obtain a first input value and a second input value. The first input value is the device key 40 stored in the OTP memory 38 or in other non-volatile memory of the SoC system 200. The second input value is a context string 45 stored in the OWBR 52. The context string 45 may be a public (i.e., not secret) context string. For example, the context string 45 may be a binary plain text string. The context string 45 may include key material suitable for use by the key derivation circuit 65 in deriving a key according to symmetric key cryptography standards and/or procedures. The key derivation circuit 65 is configured to implement the HKDF and generate an output value in the output register 54 based on the first input value and the second input value. The output value may be a derivative key 70. The output value of the key derivation circuit 65 changes in response to changes in the second input value (i.e., changes to the contents of the OWBR 52). Therefore, changes to the bit values of the OWBR 52 change, or perturb, the value of the output register 54.

The HKDF is a one-way cryptographic function. As such, it is computationally infeasible to determine the first input value and the second input value from the output value from the HKDF. Thus knowledge of the derivative key 70 does not enable derivation of any key material used to generate the derivative key 70. Furthermore, it is computationally infeasible to determine the first input value (i.e., the device key 40) from the output value even with knowledge of the second input value (i.e., the public context string 45).

The context string 45 corresponds to a respective EE according to a context string allocation protocol. The context string allocation protocol is an agreement between EEs to use context string values corresponding to and reserved for each EE according to the protocol. While the context string allocation protocol may not indicate explicit trust between EEs, it may indicate the existence of the agreement between EEs to use the reserved context string values. According to the public key allocation protocol, each respective EE may correspond to a one or more context string values reserved for the respective EE. In an example, the usual or existing boot chain sequence for the electronic device may include EE A, EE B, and EE C (e.g., the PBL, the SBL, the HLOS kernel). The usual or existing boot chain sequence may change (e.g., permanently, periodically, per instruction, per implementation of the electronic device, etc.) to include one or more new, additional, and/or replacement EEs (e.g., EE X, EE Y).

In an embodiment, each respective EE in the boot chain sequence may correspond to a single context string. The single context string may be input to the HKDF as key material along with the device key 40. The processor 60 may generate the single context string in the OWBR when an EE initially assumes control of the SoC system 200 and/or prior to key generation by the EE. The processor 60 may generate the single context string in response to instruction from the current EE and/or in response to a signal from the key derivation circuit controller 68. For example, EE A may correspond to the single context string "0000001," EE B may correspond to the single context string "00000011," EE C may correspond to the single context string "00000111," etc. The context string values are examples only and not limiting of the disclosure. Other values are within the scope of the disclosure. New, additional, and/or replacement EEs may also correspond to respective single context strings. The values of these single context strings may be intermediary values and/or values greater than the values corresponding to the EEs in the usual or existing boot chain sequence. For example, EE X may correspond to the single context string "00000101" and may replace EE B in the boot chain sequence. As another example, EE Y may correspond to the single context string "00001111" and may follow EE C in the boot chain sequence.

In other embodiments, each respective EE in the boot chain sequence may correspond to a pair of context strings. The pair of context strings may include an initial context string and a final context string. The processor 60 may generate the initial context string in the OWBR when a particular EE initially assumes control of the SoC system 200 (i.e., when the particular EE becomes the current EE) and/or prior to key generation by the current EE. The processor 60 may generate the final context string in the OWBR subsequent to one or more key derivation events for the current EE and prior to the current EE relinquishing control of the SoC system 200 and/or handing control of the SoC system 200 to the processor 60 and/or a subsequent EE. Further, the processor 60 may generate the initial and final context strings in the OWBR in response to instructions from the current EE and/or in response to one or more signals from the key derivation circuit controller 68.

In an implementation, the initial and final context strings may be adjacent and sequential values. For example, the initial context string for EE A may be "00000010" and the final context string for EE A may be "00000011." In this implementation, each EE may correspond to a respective adjacent and sequential pair of values. In another implementation, the current EE and/or the processor 60 may select the initial and final context string from a range of context string values corresponding to the current EE. For example, the range of context string values corresponding to EE A may be "00000000"-"00001111." The selected initial context string for EE A may be "00000010" and the selected final context string for EE A may be "00000011." In this implementation, each EE may correspond to a respective range of values. The quantity of context string values in the range may be the same or may be different for various EEs in the boot chain sequence.

New, additional and/or replacement EEs may also correspond to pairs of context strings and/or ranges of context string values. As examples, in various implementations, the pairs of context strings and/or ranges of context string values for EE X, EE Y may be intermediary values and/or values greater than the pairs of context strings and/or ranges of context string values for EE A, EE B, and EE C. Context string values and ranges unused by the usual or existing EEs in the boot chain sequence may be referred to as buffer values and buffer ranges, respectively. Designation of buffer values and/or buffer ranges in the context string allocation protocol for new, additional and/or replacement EEs may accommodate changes to the boot chain sequence.

In an embodiment, key derivation circuit controller 68 may automatically generate the single context string and/or the initial and final context strings according to a counter operation. The counter operation may increment the value of the context string for successive EEs in the boot chain sequence. The increment interval may be a value of one or more and may be the same or different for various EE successions. The automatically generated context strings may correspond to the context string allocation protocol. The key derivation circuit controller 68 may provide a signal to the processor 60 to write the automatically generated context string into the OWBR 52. In an implementation, the context strings may be generated by a combination of the counter operation and reserved context strings according to the context string allocation protocol.

Figure 4:
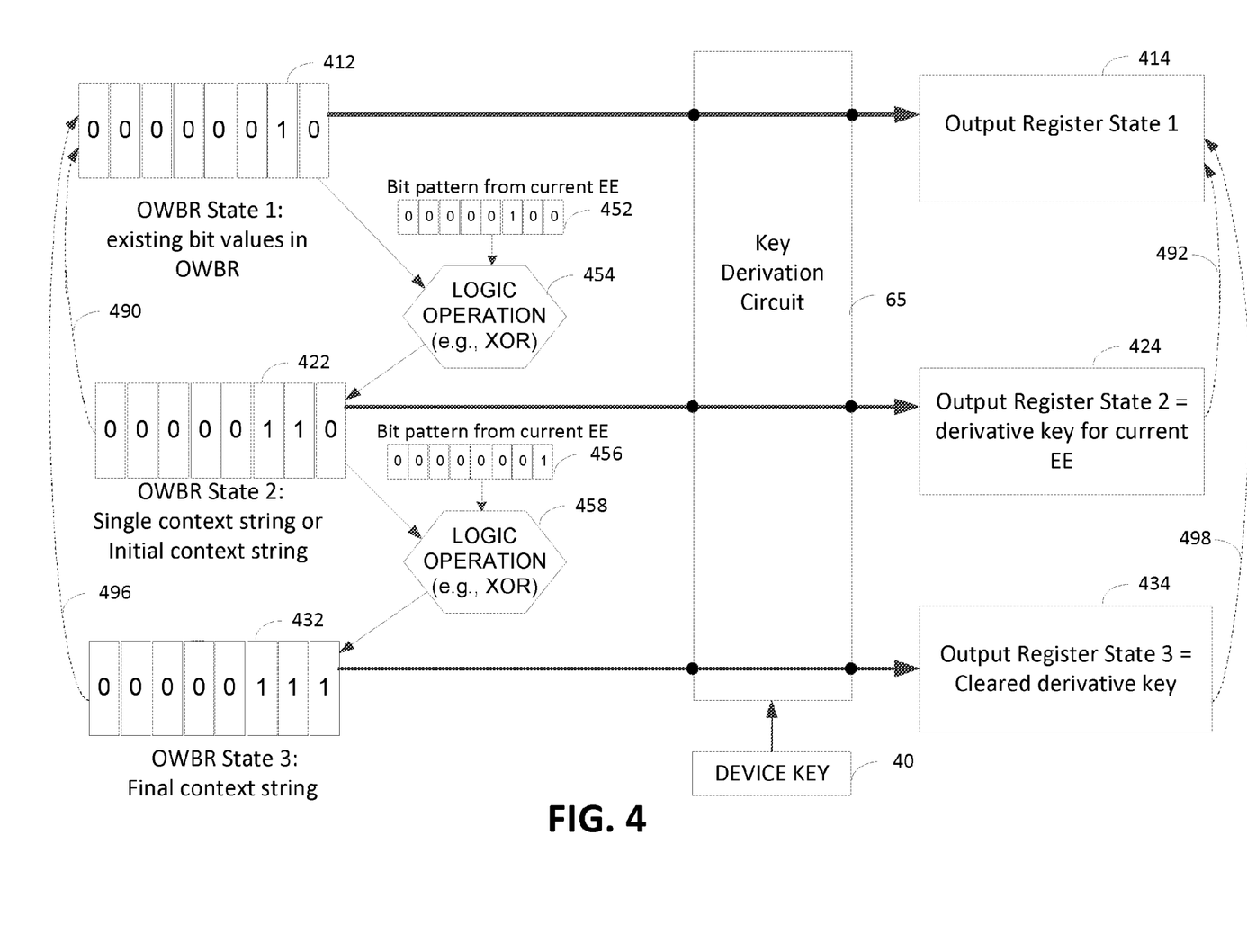
FIG. 4 is a schematic diagram of an example of a register state progression.

Referring to FIG. 4, with further reference to FIGS. 1-3, an example of a register state progression is shown. The values and quantities of OWBR bits of FIG. 4 are examples only and not limiting. In this example, the OWBR 52 is represented by an 8-bit register.

In an initial state 412 of the OWBR 52 (e.g., OWBR State 1), the bit values in the OWBR 52 are existing bit values. The existing bit values are the bit values existing in the OWBR 52 when the current EE assumes control of the SoC system 200. The existing bit values in the OWBR 52 may correspond to default values of the OWBR 52 at power-on reset. For example, the current EE at power-on reset may be the PBL. The existing bit values in the OWBR 52 may correspond to the default unprogrammed values at power-on reset. The bit values of the OWBR 52 may return to the default unprogrammed values in response to the power-on and power-on-reset events. As a result, the OWBR 52 may provide at least an advantage that the provided bit pattern for the PBL may be equivalent to the context string for the PBL. This may provide consistent PBL functionality at every power-on reset. Furthermore, this capability may be provided despite changes to the value stored in the OWBR 52 subsequent to PBL execution. In contrast, for example, changes to an OTP memory device are persistent over time. The values in the OTP memory device do not reset to default values in response to a power-on or power-on-reset event. As another example, the current EE may be an EE downstream from the PBL (e.g., SBL, HLOS kernel, HLOS, applications, etc.). In this case, the existing bit values in the OWBR may correspond to a single context string or a final context string corresponding to a prior EE.

At least due to the coupling of the OWBR 52, the output register 54, and the key derivation circuit 65, a state of the OWBR 52 corresponds to a state of the output register 54. Further, any state change (e.g., value change) to the OWBR 52 produces a state change of the output register 54. Accordingly, and as shown schematically in FIG. 4, the initial state 412 of the OWBR 52 corresponds to a first state 414 of the output register 54 (e.g., output register state 1). The current EE may read the existing bit values in the OWBR. Based on the existing bit values, the current EE may provide a bit pattern 452 (e.g., a first bit pattern) to a logic operation 454 (e.g., a first logic operation). The logic operation 454 may logically combine the existing bit values in the OWBR 52 with the provided bit pattern 452 to transition the OWBR 52 to a second state 422 (e.g., OWBR State 2). In the second state 422, the contents of the OWBR 52 correspond to the single context string or the initial context string for the current EE. For example, as shown in FIG. 4, the existing bit values may be "00000010." The current EE may provide the bit pattern 452 of, for example, "00000100." An XOR logic operation on the existing value in the OWBR of "00000010" and the bit pattern "00000100" provided by the current EE may generate the context string "00000110" in the OWBR 52 and transition the OWBR 52 to a second state 422 (e.g., OWBR State 2. The generated context string "00000110" may be the single context string or the initial context string corresponding to the current EE. The XOR operation shown in FIG. 4 is an example only of a logic operation and is not limiting of the disclosure.

The second state 422 of the OWBR 52 corresponds to a second state 424 of the output register 54 (e.g., output register state 2). In the second state 424 of the output register 54, the contents of the output register 54 correspond to the derivative key for the current EE. The key derivation circuit 65 implements the hardware embedded key derivation function to generate the derivative key based on the contents of the OWBR 52 and the device key 40. The device key 40 (e.g., the first input value) and the contents of the OWBR 52 in the second state 422 (e.g., the second input value) are the key material provided to the key derivation circuit 65 for the current EE. The processor 60 may read the derivative key from the output register 54 and the current EE may use this operational derivative key to encrypt/decrypt assets.

In a single context string implementation, once the processor 60 reads the derivative key from the output register 54, control of the SoC system 200 may transition to a subsequent EE Upon transition, the "current" EE becomes the prior EE and the "subsequent" EE becomes the current EE. Further, upon transition, the OWBR 52 is in the OWBR State 1 and the output register 54 is in the output register state 1 (e.g., as indicated by the dotted arrows 490 and 492). In this case of the prior EE corresponding to the single context string, the existing bit values in the OWBR 52 for the current EE may be the single context string from the prior EE. Further, the bit values in the output register 54 may be the derivative key for the prior EE. As such, the derivative key of the prior EE may be visible to the current EE. However, once the current EE transitions the OWBR 52 to the second state 422 in order to generate its own corresponding context string, the derivative key from the prior EE is cleared from the output register 54.

In a pair of context strings implementation, once the processor 60 reads the derivative key from the output register 54, the OWBR 52 may transition to a third state 432 (e.g., OWBR state 3). The current EE may provide a bit pattern 456 (e.g., a second bit pattern) to a logic operation 458 (e.g., a second logic operation). The logic operation 458 may logically combine the initial context string in the OWBR 52 with the provided bit pattern 456 to transition the OWBR 52 to a third state 432 (e.g., OWBR State 3). In the third state 432, the contents of the OWBR 52 correspond to the final context string for the current EE. The value of OWBR 52 may correspond to a value with at least one bit changed from the second state 422. For example, in the third state 432 the final context string is "00000111." The changed bit of the OWBR 52 changes the value stored in the output register 54. Therefore, the third state 432 of the OWBR 52 corresponds to a third state 434 of the output register 54 (e.g., output register state 3). The output register 54 transitions to the third state 434 concurrently with the state change of the OWBR 52. The value of the output register 54 in the third state 434 is a perturbed value. The perturbed value may be a non-operational derivative key unused for encryption/decryption operations. The perturbed value effectively clears the derivative key from the output register 54. Thus, in the third state 434 of the output register 54, the contents of output register 54 correspond to a cleared derivative key. In other words, the final context string in the OWBR 52 changes the value stored in the output register 54 so that the value stored in the output register 54 no longer corresponds to the derivative key for the current EE. Furthermore, the value of the output register 54 is not equal to the derivative key for any other EE. Subsequent to the generation of the final context string in the OWBR 52, the control of the SoC system 200 may transition from the current EE to the subsequent EE. Upon transition, the "current" EE becomes the prior EE and the "subsequent" EE becomes the current EE. Further, upon transition, the OWBR 52 is in the OWBR State 1 and the output register 54 is in the output register state 1. (e.g., as indicated by the dotted arrows 496 and 498). In this case, the derivative key of the current EE may be invisible to the subsequent EE. As such, the pair of context string values may provide enhanced security over the single context string value. However, the single context string value may provide a simplified implementation over the pair of context string values. Thus, variations in the context string allocation protocol may provide an ability to adjust the security of the derivative keys based on particular security requirements for the electronic device.

Figure 5:
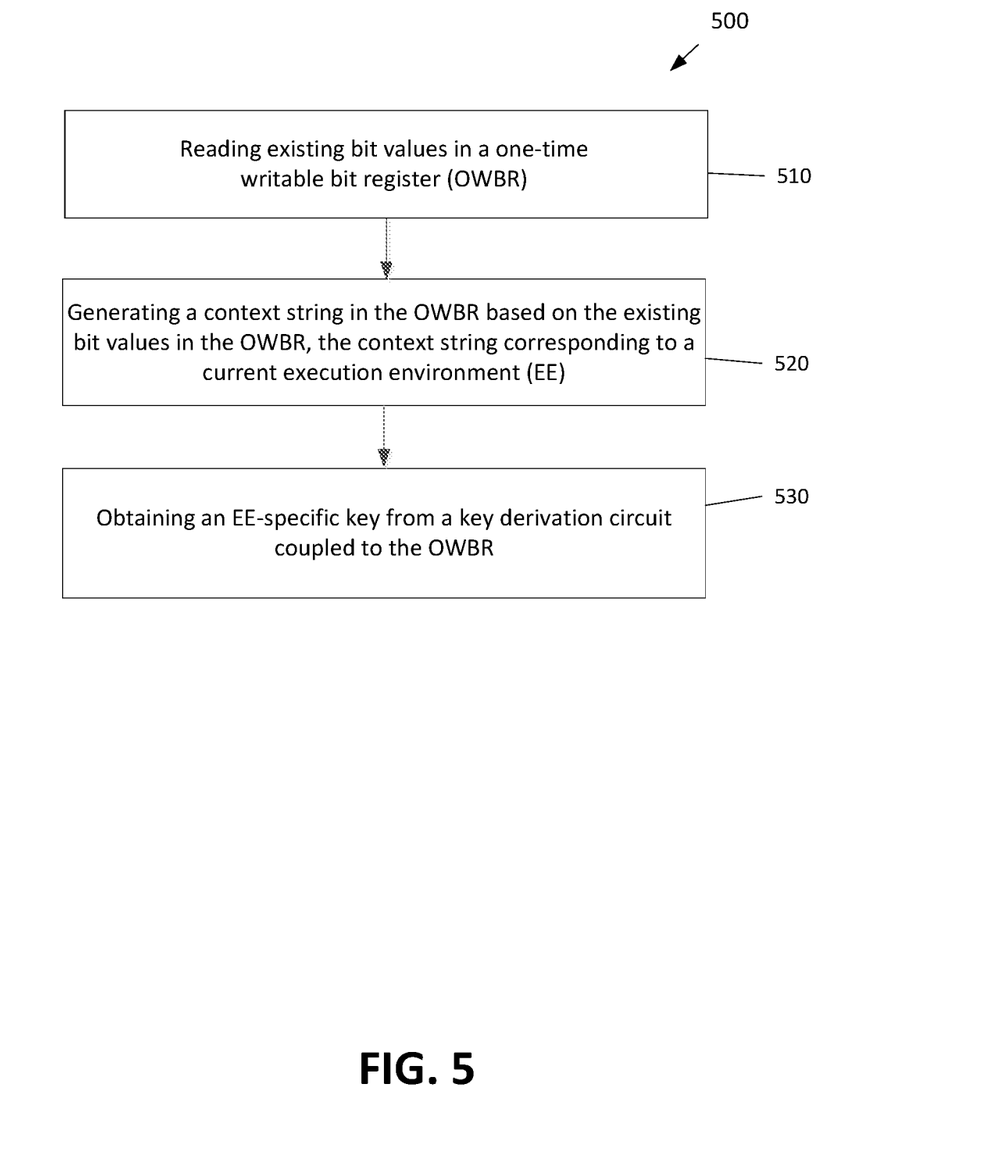
FIG. 5 is a block diagram of a method of obtaining a derivative key by an execution environment.

Referring to FIG. 5, with further reference to FIGS. 1-4, a method 500 of obtaining a derivative key by an execution environment includes the stages shown. The method 500 is, however, an example only and not limiting. The method 500 can be altered, e.g., by having stages added, removed, rearranged, combined, performed concurrently and/or having stages split into multiple stages. The processor 60 may execute instructions of the current EE in order to perform the method 500.

At stage 510, the method 500 includes reading existing bit values in a one-time writable bit register (OWBR). For example, the processor 60 may read the existing bit values in the OWBR 52. The existing bit values may correspond to one of an unprogrammed value of the OWBR 52 at power-on reset, the value of the single context string corresponding to a prior EE, or the value of the final context string corresponding to the prior EE.

The stage 510 may include verifying, by the processor 60, that the existing bit values conform to the context string allocation protocol. For example, if a prior EE, or other EE, is actively malicious and writes an unauthorized value (e.g., a value in violation of the context string allocation protocol) to the OWBR 52, the existing bit values of the OWBR 52 may provide forensic evidence of such a security breach. Any or all of the default unprogrammed value of the OWBR 52, the single context string value for the prior EE, and the final context string value for the prior EE may be less than a value of one or more context strings corresponding to the current EE according to the context string allocation protocol. The forensic evidence may be a value stored in the OWBR 52 that exceeds the value of one or more context strings corresponding to the current EE. Violation of the context string protocol may indicate malicious intent, for example, due to a hack attack, by the prior or other EE. In response to a determination that the context string allocation protocol has been violated, the processor 60 may halt execution of the current EE, generate an error message, and/or provide another indication of the protocol violation.

At stage 520, the method 500 includes generating a context string in the OWBR based on existing bit values in the OWBR, the context string corresponding to a current execution environment (EE). For example, the processor 60 may generate the context string corresponding to the current EE. The stage 520 may include providing a bit pattern (e.g., a first bit pattern) to the processor 60 based on the existing bit values in the OWBR 52. Further, the stage 510 may include logically combining the provided bit pattern with the existing bit values in order to generate the context string in the OWBR 52. For example, the processor 60 may implement a logic operation on the provided bit pattern and the existing bit values in the OWBR 52. The stage 520 may include writing the generated context string to the OWBR 52. For example, the processor 60 may write the generated context string to the OWBR 52. Writing the generated context string may include writing to one or more previously unwritten bits of the OWBR 52. Further, writing the generated context string may include writing the single context string corresponding to the current EE or writing the initial context string corresponding to the current EE.

At stage 530, the method 500 includes obtaining an EE-specific key from a key derivation circuit coupled to the OWBR. For example, the processor 60 may obtain a current EE-specific derivative key output by the key derivation circuit 65 and stored in the output register 54. The current derivative key may be based on the generated key input written to the OWBR 52 (i.e., the context string corresponding to the current EE) and on the device key 40. The EE-specific key may be derived according to the HKDF as implemented by the key derivation circuit 65. However, the current derivative key is not based on a derivative key from any other EE. Neither another derivative key nor a hash or other mathematically altered version of another derivative key or the result of a logical combination of the derivative key with another key form or contribute to an input to the HKDF. For at least this reason, the derivative key is the EE-specific key and is derived independently from keys for EEs executing prior to and subsequent to the current EE. The stage 530 may include using the EE-specific key for one or more of encrypting assets, decrypting assets, or a combination thereof. For example, the processor 60 may execute instructions from the current EE to encrypt and/or decrypt assets using the current derivative key.

The stage 530 may further include providing a second bit pattern to the processor 60 and generating a final context string corresponding to the current EE in the OWBR 52. For example, the processor 60 may generate the final context string corresponding to the current EE based on the logical combination of the initial context string and the provided second bit pattern. The processor 60 may write the final context string into the OWBR 52. Writing the final context string into the OWBR 52 may include writing to one or more previously unwritten bits of the OWBR 52. Once the at least one bit is written to, that bit cannot be reset to a previous value in the absence of a power-on-reset. Writing the final context string to the OWBR 52 the value of the OWBR 52. The changed value of the OWBR 52 changes, or perturbs, the output value from the HKDF stored in the output register 54. This effectively clears the current derivative key from the output register 54. Additionally, writing to the at least one bit of the OWBR 52 irreversibly changes the value stored in the OWBR 52 for the duration of the SoC power cycle. Therefore, the generated initial context string of the stage 520 (i.e., the key input material) is irreproducible in the OWBR 52 by a subsequent EE. In other words, during execution of subsequent EEs, the processor 60 cannot re-write bits in the OWBR 52 to reproduce the generated key input from any prior EE. In this manner, the OWBR 52 may block re-creation of the derived key for the prior EE by the subsequent EE. Due to the hardware properties of the OWBR 52, even with knowledge of the key input for the prior EE, the processor 60 cannot recreate the value of the prior key input in the OWBR 52.

The stage 530 may additionally include handing over control of the SoC system 200 by the current EE to a subsequent EE in the boot chain sequence. For example, the processor 60 may execute instructions for the current EE to hand over control directly to the subsequent EE. Alternatively, the processor 60 may execute instructions for the current EE to hand control to the processor 60 and execute instructions for the processor 60 to hand control to the subsequent EE. The method 500 may return to the stage 510 in order to generate a respective EE-specific key for the subsequent EE.

Figure 6:
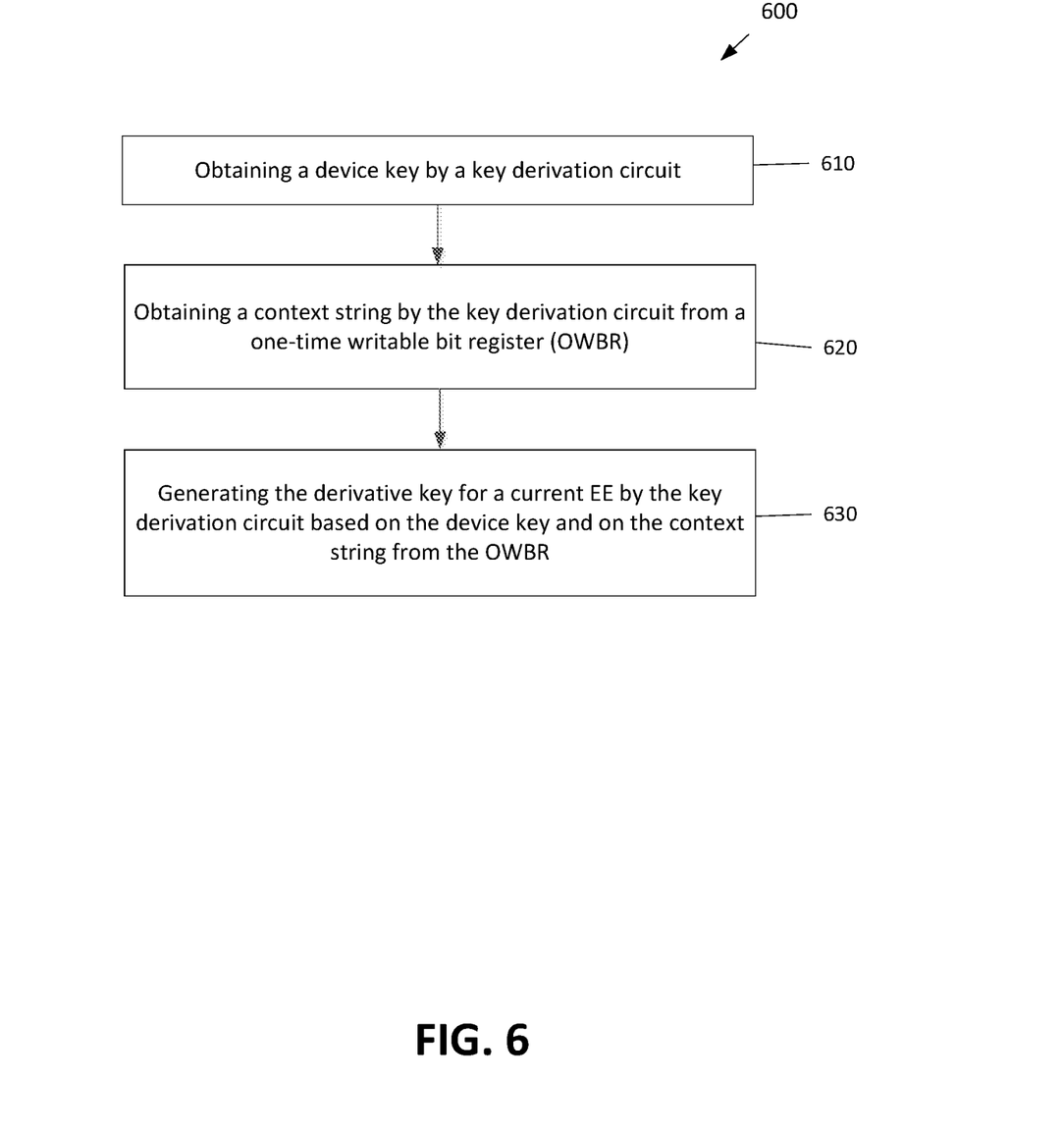
FIG. 6 is a block diagram of a method of generating a derivative key for an execution environment.

Referring to FIG. 6, with further reference to FIGS. 1-5, a method 600 of generating a derivative key for an EE includes the stages shown. The method 600 is, however, an example only and not limiting. The method 600 can be altered, e.g., by having stages added, removed, rearranged, combined, performed concurrently and/or having stages split into multiple stages. The key derivation circuit 65, the key derivation circuit controller 68, and/or the processor 60 may perform the various stages and/or portions thereof of the method 600. Alternatively or additionally, the processor 60 may execute instructions stored in the memory 30 that cause the key derivation circuit 65, the key derivation circuit controller 68, and/or the processor 60 to perform the various stages and/or portions thereof of the method 600.

At stage 610, the method 600 includes obtaining a device key by a key derivation circuit. For example, the key derivation circuit 65 may obtain the device key (e.g., a first input value) from a non-volatile memory device (e.g., the OTP memory 38). The device key may be the single device key 40. The key derivation circuit controller 68 may cause the key derivation circuit 65 to obtain the device key.

At stage 620, the method 600 includes obtaining a context string by the key derivation circuit from a one-time writable bit register (OWBR). For example, the key derivation circuit 65 may obtain the context string (e.g., a second input value) from the OWBR 52. The context string may be the context string corresponding to the particular EE currently executing in the SoC system 200. The key derivation circuit controller 68 may cause the key derivation circuit 65 to obtain the context string from the OWBR 52. In an implementation, obtaining the context string may include obtaining a single context string corresponding to the current EE. In another implementation, obtaining the context string may include obtaining an initial context string and a final context string (e.g., a pair of context strings). The pair of context strings (e.g., the initial context string and the final context string) may correspond to the current EE. Obtaining the pair of context strings may include obtaining the pair of context strings sequentially. For example, the key derivation circuit controller 68 may cause the key derivation circuit 65 to obtain the initial context string prior to generating the derivative key for the current EE. After generating the derivative key (e.g., subsequent to generating the derivative key), the key derivation circuit controller 68 may cause the key derivation circuit 65 to obtain the final context string.

The stage 620 may include writing the context string to the OWBR 52. For example, the key derivation circuit controller 68 may provide a signal to the processor 60 indicative of a write operation to the OWBR 52 (i.e., a first write operation). The signal may include the context string corresponding to the current EE.

The stage 620 may include determining, by the processor 60 and/or the key derivation circuit controller 68, the existing value of the OWBR 52. For example, the key derivation circuit controller 68 may provide a signal to the processor 60 indicative of a read operation from the OWBR 52. In response to the read operation, the processor 60 may provide a bit pattern and the existing bit values to a logic operation to generate the context string corresponding to the current EE. In further response to the read operation, the stage 620 may further include verifying, by the processor 60 and/or the key derivation circuit controller 68, that the existing value of the OWBR 52 follows the context string allocation protocol and does not violate the context string allocation protocol. For example, the processor 60 and/or the key derivation circuit controller 68 may determine that the existing value of the OWBR 52 follows or violates the context string allocation protocol. If the context string corresponding to the current EE is greater than the existing value in the OWBR 52, then the method 600 may include determining that the context string allocation protocol has not been violated. In this case, the boot chain sequence may proceed and the processor 60 may not generate an indication of a violation of the protocol. If the context string corresponding to the current EE is less than the existing value in the OWBR 52, then the method 600 may include determining that the context string allocation protocol has been violated. The existing value of the OWBR may correspond to the single context string or the final context string corresponding to the prior EE. For the PBL, the corresponding context string may be greater than an existing unprogrammed value of the OWBR 52. Violation of the context string protocol may indicate malicious intent, for example, due to a hack attack, by the prior or other EE. The stage 620 may include, in response to determining that the context string allocation protocol has been violated, halting execution of the current EE, generating an error message, and/or generating another indication of a violation of the context string allocation protocol. The processor 60 may halt execution, generate the error message, and/or provide the protocol violation indication. In an implementation, the key derivation circuit controller 68 may cause the processor to perform one or more of these actions.

At stage 630, the method 600 includes generating the derivative key for the current EE by the key derivation circuit based on the device key and on the context string from the OWBR. For example, the key derivation circuit 65 may generate the derivative key based on the device key 40 and the contents of the OWBR 52. The key derivation circuit controller 68 may cause the key derivation circuit 65 to provide the derivative key to the output register 54. In an embodiment, the key derivation circuit controller 68 may provide a signal to the processor 60 indicative of a read operation from the output register 54. In response to such a signal, the processor 60 may read the derivative key from the output register 54 and provide the derivative key to the current EE for use in encryption and/or decryption of assets.

In an embodiment, the context string is the single context string corresponding to the current EE. In a further embodiment, the context string is a pair of context strings corresponding to the current EE. In such an embodiment, generating the derivative key includes generating the derivative key for the current EE based on the device key and on an initial context string of the pair of context strings. The derivative key based at least in part on the initial context string may be an operational derivative key for use by the EE in encryption and/or decryption operations. The derivative key may be a first output value of the key derivation circuit and the method 600 may include generating a second output value by the key derivation circuit. The second output value may be a perturbed output based at least in part on a final context string of the pair of context strings corresponding to the current EE. The perturbed output may be unequal to the derivative key. The perturbed output may be a non-operational derivative key unused by the current EE for encryption and/or decryption operations. This non-operational derivative key may replace the derivative key in the output register 54 and, thereby, clear the value of the derivative key from the output register 54. As discussed above, the key derivation circuit 65 may obtain the final context string and generate the perturbed output subsequent to the generating the derivative key. For example, the processor 60 may write to at least one bit of the OWBR 52 (e.g., a second write operation). Writing the final context string (e.g., a third input value to the key derivation circuit 65) to the OWBR 52 may change the value of at least one previously unprogrammed bit in the OWBR 52. In response to the change of the at least one bit in the OWBR 52, the output value of the key derivation circuit 65, as stored in the output register 54, may change from the derivative key for the current EE to the perturbed output (i.e., the non-operational derivative key). The perturbed output value may be unequal to and unobtainable from the derivative key (i.e., the non-operational derivative key may not be derivable from the operational derivative key). The contents of the output register 54 only correspond to the derivative key as long as the values of the bits of the OWBR 52 remain unchanged from the context string used to derive the derivative key (i.e., the single context string or the initial context string). The perturbed output value does not correspond to the derivative key for the current EE or to any derivative key for usage by any EE. As such, the perturbed output value merely reflects the write operation to the OWBR 52 of the final context string and serves to effectively clear, or erase, the derivative key from the output register 54. The method 600 may return to the stage 610 in response to processor operations for a subsequent EE.

OTHER CONSIDERATIONS

Other embodiments are within the scope of the invention. For example, due to the nature of software, functions described above can be implemented using software, hardware, firmware, hardwiring, or combinations thereof. Features implementing functions may also be physically located at various locations, including being distributed such that portions of functions are implemented at different physical locations. Also, as used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition. As used herein, including in the claims, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "processor-readable storage medium," as used herein, refer to any medium that participates in providing data that causes a machine to operate in a specific fashion. Using a computer system, various processor-readable media (e.g., a computer program product) might be involved in providing instructions/code to processor(s) for execution and/or might be used to store and/or carry such instructions/code (e.g., as signals). In many implementations, a processor-readable storage medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible processor-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer or processor can read instructions and/or code (i.e., processor-readable).

Various forms of processor-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

Information and signals may be represented using any of a variety of different technologies and techniques. For example, data, instructions, commands, information, signals, and symbols that may be referenced throughout the above description may be represented by voltages, currents, electromagnetic waves, magnetic fields or particles, optical fields or particles, or any combination thereof.

The methods, systems, and devices discussed above are examples. Various alternative configurations may omit, substitute, or add various procedures or components as appropriate. Configurations may be described as a process which is depicted as a flow diagram or block diagram. Although each may describe the operations as a sequential process, many of the operations can be performed in parallel or concurrently. In addition, the order of the operations may be rearranged. A process may have additional stages not included in the figure.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory processor-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the disclosure. For example, the above elements may be components of a larger system, wherein other rules may take precedence over or otherwise modify the application of the invention. Also, a number of operations may be undertaken before, during, or after the above elements are considered. Also, technology evolves and, thus, many of the elements are examples and do not bound the scope of the disclosure or claims. Accordingly, the above description does not bound the scope of the claims. Further, more than one invention may be disclosed.

What is claimed is:

1. A method of generating a derivative key for an execution environment (EE) comprising:
    obtaining a first input value by a key derivation circuit;
    obtaining a second input value by the key derivation circuit, the second input value being from a one-time writable bit register (OWBR), the OWBR being configured such that each bit of the OWBR can only be written to one time per power cycle and the contents of the OWBR are lost when the OWBR is powered down or reset; and
    generating an output value by the key derivation circuit based on the first input value and on the second input value from the OWBR, the output value corresponding to a derivative key for a current EE.

2. The method of claim 1 wherein obtaining the first input value comprises obtaining a single device key from a non-volatile memory device.

3. The method of claim 1 wherein generating the output value comprises generating an EE-specific derivative key.

4. The method of claim 3 wherein generating the EE-specific derivative key comprises generating the EE-specific derivative key independently from derivative keys for EEs prior to and subsequent to the current EE in a boot chain sequence.

5. The method of claim 1 wherein obtaining the second input value comprises obtaining a single context string corresponding to the current EE.

6. The method of claim 1 wherein obtaining the second input value comprises obtaining an initial context string of a pair of context strings corresponding to the current EE.

7. The method of claim 6 wherein the output value is a first output value and further comprising:
    obtaining a third input value by the key derivation circuit from the OWBR, the third input value comprising a final context string of the pair of context strings corresponding to the current EE generated subsequent to one or more key derivation events during generation of the output value by the key derivation circuit; and
    generating a second output value by the key derivation circuit, the second output value being a perturbed output value unequal to and unobtainable from the derivative key.

8. The method of claim 1 further comprising:
    determining, by a processor coupled to the key derivation circuit, an existing value of the OWBR;
    determining, by the processor, that the second input value is less than the existing value in the OWBR; and
    generating, by the processor, an indication of a violation of a context string allocation protocol.

9. The method of claim 1, further comprising:
    modifying the second input value in the OWBR responsive to the output values being generated to prevent the derivative key for the current EE from being regenerated.

10. An apparatus comprising:
    a memory comprising:
        a non-volatile memory device;
        an output register; and
        a one-time writable bit register (OWBR), the OWBR being configured such that each bit of the OWBR can only be written to one time per power cycle and the contents of the OWBR are lost when the OWBR is powered down or reset; and
    a processor coupled to the memory and comprising:
        a key derivation circuit coupled to the non-volatile memory device, the output register, and the OWBR and configured to receive a first input value from the non-volatile memory device and a second input value from the OWBR and further configured to provide an output value to the output register.

11. The apparatus of claim 10 wherein the first input value from the non-volatile memory device is a single device key.

12. The apparatus of claim 10 wherein the second input value is a context string corresponding to a current execution environment (EE) and the output value is an EE-specific derivative key for the current EE.

13. The apparatus of claim 10 wherein the output value is a first output value and the key derivation circuit is further configured to receive a third input value from the OWBR generated subsequent to one or more key derivation events during generation of the output value by the key derivation circuit and to provide a second output value to the output register, wherein the second output value is a perturbed output value unequal to and unobtainable from the first output value.

14. The apparatus of claim 10 comprising one or more OWBRs, a number of OWBRs corresponding to a number of parallel boot flows supported by an electronic system that includes the apparatus.

15. The apparatus of claim 10 wherein the processor is configured to:
    determine an existing value of the OWBR;
    determine that the second input value is less than the existing value in the OWBR; and
    generate an indication of a violation of a context string allocation protocol.

16. An apparatus comprising:
    means for obtaining a first input value by a key derivation circuit;
    means for obtaining a second input value by the key derivation circuit, the second input value being from a one-time writable bit register (OWBR), the OWBR being configured such that each bit of the OWBR can only be written to one time per power cycle and the contents of the OWBR are lost when the OWBR is powered down or reset; and
    means for generating an output value by the key derivation circuit based on the first input value and on the second input value from the OWBR, the output value corresponding to a derivative key for a current execution environment (EE).

17. The apparatus of claim 16 wherein the means for obtaining the first input value comprises means for obtaining a single device key from a non-volatile memory device.

18. The apparatus of claim 16 wherein the means for generating the output value comprises means for generating an EE-specific derivative key.

19. The apparatus of claim 18 wherein the means for generating the EE-specific derivative key comprises means for generating the EE-specific derivative key independently from derivative keys for EEs prior to and subsequent to the current EE in a boot chain sequence.

20. The apparatus of claim 16 wherein the means for obtaining the second input value comprises means for obtaining a single context string corresponding to the current EE.

21. The apparatus of claim 16 wherein the means for obtaining the second input value comprises means for obtaining an initial context string of a pair of context strings corresponding to the current EE.

22. The apparatus of claim 21 wherein the output value is a first output value and further comprising:
means for obtaining a third input value by the key derivation circuit from the OWBR, the third input value comprising a final context string of the pair of context strings corresponding to the current EE generated subsequent to one or more key derivation events during generation of the output value by the key derivation circuit; and
means for generating a second output value by the key derivation circuit, the second output value being a perturbed output value unequal to and unobtainable from the derivative key.

23. The apparatus of claim 16 further comprising:
means for determining an existing value of the OWBR;
means for determining that the second input value is less than the existing value in the OWBR; and
means for generating an indication of a violation of a context string allocation protocol.

24. A non-transitory processor-readable storage medium comprising processor-readable instructions comprising:
instructions for obtaining a first input value by a key derivation circuit;
instructions for obtaining a second input value by the key derivation circuit, the second input value being from a one-time writable bit register (OWBR), the OWBR being configured such that each bit of the OWBR can only be written to one time per power cycle and the contents of the OWBR are lost when the OWBR is powered down or reset; and
instructions for generating an output value by the key derivation circuit based on the first input value and on the second input value from the OWBR, the output value corresponding to a derivative key for a current execution environment (EE).

25. The storage medium of claim 24 wherein the instructions for obtaining the first input value comprise instructions for obtaining a single device key from a non-volatile memory device.

26. The storage medium of claim 24 wherein the instructions for generating the output value comprise instructions for generating an EE-specific derivative key.

27. The storage medium of claim 26 wherein the instructions for generating the EE-specific derivative key comprise instructions for generating the EE-specific derivative key independently from derivative keys for EEs prior to and subsequent to the current EE in a boot chain sequence.

28. The storage medium of claim 24 wherein the instructions for obtaining the second input value comprise instructions for obtaining a single context string corresponding to the current EE.

29. The storage medium of claim 24 wherein the instructions for obtaining the second input value comprises instructions for obtaining an initial context string of a pair of context strings corresponding to the current EE.

30. The storage medium of claim 29 wherein the output value is a first output value, the instructions further comprising:
instructions for obtaining a third input value by the key derivation circuit from the OWBR, the third input value comprising a final context string of the pair of context strings corresponding to the current EE generated subsequent to one or more key derivation events during generation of the output value by the key derivation circuit; and
instructions for generating a second output value by the key derivation circuit, the second output value being a perturbed output value unequal to and unobtainable from the derivative key.

31. The storage medium of claim 24 further comprising:
instructions for determining an existing value of the OWBR;
instructions for determining that the second input value is less than the existing value in the OWBR; and
instructions for generating an indication of a violation of a context string allocation protocol.

* * * * *